3,136,694
PROCESS OF INCREASING BILE SECRETION BY 2,2-DI-(HYDROXYMETHYL)-BICYCLO-(2,2,1)-HEPTENE-5
Erich Müller, Biberach an der Riss, Germany, assignor, by mesne assignments, to Boehringer Ingelheim G.m.b.H., Ingelheim (Rhine), Germany, a corporation of Germany
No Drawing. Filed Nov. 5, 1962, Ser. No. 235,540
Claims priority, application Great Britain Nov. 14, 1961
4 Claims. (Cl. 167—65)

The invention relates to a novel pharmacodynamic composition, and more particularly to a novel choleretic composition, as well as to a novel method of increasing the output of bile by the liver.

Numerous compositions which stimulate the output of bile by the liver, and thus the rate of secretion of bile into the intestinal tract, are known. These include the so-called cholepoietics, which stimulate the entire physiological process of bile formation in the liver parenchyma and thus produce an increase in the quantity of fluid secreted and of the solid substances contained therein. These known compositions, however, have various disadvantages: some of the active choleretic ingredients contained therein are liquid at room temperature and are therefore very difficult, if not impossible, to formulate into such solid dosage unit forms as tablets and coated pills; still other active choleretic ingredients contained therein, while being solids at room temperature, are not entirely as stable as they should be, so that the dosage unit compositions do not have a sufficiently long shelf life. Finally, the increase in the quantity of secreted bile and the simultaneous increase in the solid components which the bile contains are often insufficient to bring effective relief.

It is an object of the invention to provide novel choleretic compositions which are stable over long periods of time.

It is another object of the invention to provide novel choleretic compositions which cause an effective increase in the bile secretion rate of the liver and an effective increase in the solid content of the secreted bile at low unit dosages without undesirable side effects.

It is another object of the invention to provide a novel method of increasing the bile secretion rate of the liver and increasing the solid content of secreted bile.

These and other objects and advantages of the invention will become obvious from the following detailed description.

The novel stable choleretic compositions of the invention are comprised of 2,2-di-(hydroxymethyl)-bicyclo-(2,2,1)-heptene-5 which has the structural formula

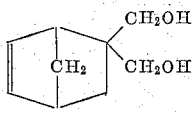

and an inert, physiologically compatible carrier. The compositions may be in solid or liquid forms, such as tablets, pills, capsules, sugar-coated pills, syrups, emulsions, elixirs, drops, etc., and contain 0.2 to 95% by weight of the active compound. The compositions may be administered orally or parenterally.

The solid compositions may have besides conventional carriers such as lactose, starch, kaolin, talc, etc., lubricants such as magnesium stearates and binders such as alginic acid or carboxymethyl cellulose. Capsules of the conventional gelatine type such as Scherer capsules may be used and may contain a diluent such as lactose.

Oral liquid compositions may include sweetening agents such as sucrose and saccharin; flavoring agents such as essential oils; suspension or thickening agents such as silicic acid and carboxymethyl cellulose; dispersing agents such as polyethylene glycol and polyethylene glycol ethers and esters; and/or preserving agents such as methyl p-hydroxy benzoate and propyl p-hydroxy benzoate. Liquid compositions for parenteral administration may have sterile, pyrogen-free water or a parenterally acceptable oil such as arachis oil as a carrier.

The compositions of the invention may contain physiologically active compounds other than 2,2-di-(hydroxymethyl)-bicyclo-(2,2,1)-heptene-5, such as spasmolytic agents and vitamins. Suitable spasmolytics which can be used to alleviate the acute pains often associated with gall bladder ailments are atropine, papaverine and dimethyl-n-octyl-($\beta$-ethyl benzilate)-ammonium bromide. Vitamins of the B-series, such as nicotinamide or aneurin mononitrate, may be present in the compositions to remedy the deficiency symptons caused by metabolism disturbance.

The novel method of the invention of increasing the bile secretion of the liver and increasing the solids content of secreted bile comprises administering an effective amount of 2,2-di-(hydroxymethyl)-bicyclo-(2,2,1)-heptene-5. The usual unit dose is between 25 to 200 mg., preferably 100 mg., of the said compound, and the usual daily dose is between 100 and 600 mg. depending upon the method of administration.

The compositions of the invention effect a more marked increase in choleretic activity than the known choleretics, p-tolylmethyl carbinol and 1-phenyl-propanol-1. The compositions of the invention showed a marked increase of cholerrhagia and a pronounced increase in the solids content of the bile secreted which declined slightly after a very strong cholerese had set in which is also observed with known choleretics.

In the following examples there are described several preferred embodiments to illustrate the invention. However, it should be understood that the invention is not intended to be limited to the specific embodiments.

EXAMPLE I

Preparation of 2,2-di-(Hydroxymethyl)-Bicyclo-(2,2,1)-Heptene-5

12.8 gms. of sodium hydroxide dissolved in 13 cc. of water were added dropwise over a period of 30 minutes to a suspension of 24.7 gms. of 2,5-endomethylene-tetrahydrobenzoldehyde in 63 gms. of 38% formalin solution heated to 85° C. After heating the reaction mixture at 90° C. for two hours, the mixture was diluted with 60 cc. of water and cooled to room temperature while stirring to obtain a crystalline product. The product, 2,2-di-(hydroxymethyl)-bicyclo - (2,2,1) - heptene-5, after filtering with suction and drying was recrystallized from chloroform to give a yield of 19 gms. (61% of theory) and it had a melting point of 112° C. The product was soluble in water up to 1.6% at 20° C. so that injectable solutions were easily prepared.

EXAMPLE II

Capsules 2,2-di-(hydroxymethyl)-bicyclo-(2,2,1)-heptene-5-was filled into gelatine capsules containing 100 mgm.

EXAMPLE III

Oblate Capsules With Atropine 10 mgm. of atropine sulfate was triturated with 90 mgm. of pulverized lactose and then the mixture was mixed with 1000 mgm. of 2,2-di-(hydroxymethyl)-bicyclo-(2,2,1)-heptene-5. The resulting mixture was passed through a 0.3 mm. sieve and then filled into oblate capsules containing 110 mgm. of the mixture.

EXAMPLE IV

Capsules With Papaverine 500 mgm. of papaverine hydrochloride and 1000 mgm. of 2,2-di-(hydroxymethyl)-bicyclo-(2,2,1)-heptene-5 were thoroughly mixed together and then passed through a 0.3 mm. sieve. The screened mixture was filled into capsules containing 150 mgm. of the mixture.

EXAMPLE V

Drops 5 gm. of 2,2-di-(hydroxymethyl)-bicyclo-(2,2,1)-heptene-5 and 0.3 gm. of peppermint oil were dissolved in 60 cc. of 96% ethanol. 0.2 gm. of sodium saccharine were dissolved in distilled water and the resulting solution was added in small portions with stirring to the alcoholic solution to form 100 cc. of solution. 1 cc. of the solution contained 50 mgm. of 2,2-di-(hydroxymethyl)-bicyclo-(2,1,1)-heptene-5.

EXAMPLE VI

Emulsion 10 gm. of 2,2-di-(hydroxymethyl)-bicyclo-(2,2,1)-heptene-5 were dissolved in a mixture of 30 gm. of polyethylene glycol sorbitan monolaurate (Tween 20), 50 gm. of polyethylene glycol 400 and 1.0 gm. of peppermint oil. 50 gm. of cane sugar, 7.0 gm. of high viscosity carboxymethyl cellulose, 0.7 gm. of methyl p-hydroxy benzoate and 0.3 gm. of propyl p-hydroxy benzoate were dissolved in distilled water heated to 80° C. The said aqueous solution was then cooled to 30° C. with stirring and 1.0 gm. of sodium saccharine was dissolved therein and 17.5 gm. of highly dispersed silicic acid (Aerosil) was stirred in. The first solution was then poured with active stirring into the aqueous suspension and the mixture was homogenized to form 1000 cc. of emulsion. 5 cc. of the emulsion contained 50 mgm. of 2,2-di-(hydroxymethyl)-bicyclo-(2,2,1)-heptene-5.

EXAMPLE VII

Sugar Coated Pills With Dimethyl-n-Octyl-(β-Ethyl Benzilate)-Ammonium Bromide 1000 mgm. of 2,2-di-(hydroxymethyl)-bicyclo-(2,2,1)-heptene-5, 100 mgm. of dimethyl-n-octyl-(β-ethyl benzilate)-ammonium bromide, 10 mgm. of tartaric acid, 1500 mgm. of lactose, 20 mgm. of magnesium stearate and 610 mgm. of maize starch were mixed and kneaded with a 20% solution containing 15 mgm. of soluble starch. The moist mass was ground through a 1.5 mm. mesh sieve, dried at 40° C. and passed again through the same sieve. The granulate was mixed with another 610 mgm. of maize starch and was pressed through a 11 mm. convex die to form pill cores weighing 400 mgm. The cores were covered with a coating of sugar and talc and were then polished with beeswax to form sugar coated pills weighing 700 mgm. each.

EXAMPLE VIII

Vitamin Sugar Coated Pills With Dimethyl-n-Octyl-(β-Ethyl Benzilate) Ammonium Bromide 1000 mgm. of 2,2-di-(hydroxymethyl)-bicyclo-(2,2,1)-heptene-5 and 1,285 mgm. of maize starch were mixed and kneaded with a 20% aqueous solution of 150 mgm. of soluble starch and the mixture was then passed through a 1.5 mm. sieve. The resulting granulate was dried at 45° C. and was again passed through the 1.5 mm. sieve.

100 mgm. of dimethyl-n-octyl-(β-ethyl benzilate) ammonium bromide, 60 mgm. of vitamin $B_1$ mononitrate and 165 mgm. of nicotinic acid amide were mixed and kneaded with a 10% alcoholic solution of 1200 mgm. of polyethylene glycol (Carbowax 6000) containing 10 mgm. of tartaric acid. The mixture was passed through a 1.5 mm. sieve, dried at 40° C. and passed through a 1.5 mm. sieve to form a granulate.

The two granulates were mixed with 20 mgm. of magnesium stearate and were pressed through a 11 mm. convex die to form pill cores weighing 40 mgm. The said cores were coated with sugar and talc and were then polished with beeswax to form sugar coated pills weighing 700 mgm.

EXAMPLE IX

Ampoules 250 mgm. of 2,2-di-(hydroxymethyl)-bicyclo-(2,2,1)-heptene-5 were dissolved in 15 cc. of cold water and sufficient cold water was added to obtain a final volume of 20 cc. The solution was filtered free of suspended solids and after sterilization at 100° C. for 30 minutes was added to white 2 cc. ampoules.

PHARMACOLOGICAL DATA

A. Choleretic Activity on Rats

The experiments were conducted on rats under urethane narcosis. A cannula was introduced into the ductus choledochus and the number of drops flowing out was measured two hours before and 1, 2, 3 and 4 hours after the administration of 100 mg./kg. of active substance administered intraduodenally. The quantity of bile was measured with a drop counter and expressed in terms of percentages based on an untreated control. The improved choleretic activity of 2,2-di-(hydroxymethyl)-bicyclo-(2,2,1)-heptene-5 was compared with known choleretics, 1-phenyl-propanol-(1) and p-tolyl methyl carbinol, and the results are summarized in Table I.

TABLE I

| Compound | Percent increase in bile secreted after administration | | | |
|---|---|---|---|---|
| | 1 hr. | 2 hrs. | 3 hrs. | 4 hrs. |
| 2,2-di(hydroxymethyl)-bicyclo-(2,2,1)-heptene-5. | +133 | +89 | +44 | +17 |
| 1-phenyl-propanol-1 | +71 | +62 | +39 | +19 |
| p-Tolyl methyl carbinol | +33 | +14 | 0 | −5 |

2,2-di-(hydroxymethyl)-bicyclo-(2,2,1)-heptene-5 was fully effective on rats suffering from liver complaints. The duration of the effect was comparable to known choleretics and the bile secretion approached its normal rate after four hours.

B. Increase in Solids in Bile

The determination of the solid substance content was carried out on dogs under normal narcosis. The quantity of solid substance secreted one hour after administration of 50 mg./kg. of 2,2-di-(hydroxymethyl)-bicyclo-(2,2,1)-heptene-5 was three times the quantity of an untreated control.

C. Toxicity and Side Effects

The $LD_{50}$ of 2,2-di-(hydroxymethyl)-bicyclo-(2,2,1)-heptene-5 administered orally to mice was above 6 gm./kg. while the $LD_{50}$ of 1-phenyl-propanol-1 administered orally to mice was 1.5 gm./kg.

2,2-di-(hydroxymethyl)-bicyclo-(2,2,1)-heptene-5 did not induce any marked side effects. The blood pressure of rats showed no perceptible changes at an intravenous dose of 20 mg./kg. An intravenous dose of 10 mg./kg. to rats had no noticeable effect on the heart frequency, on the ganglia or on the respiration.

Various modifications of the compositions of the invention may be made without departing from the scope thereof and it is to be understood that the invention is to be limited only as defined in the appended claims.

I claim:

1. A method of increasing the bile secretion rate of the liver and increasing the solids content of the secreted bile which comprises administering an effective amount of 2,2-di-(hydroxymethyl)-bicyclo-(2,2,1)-heptene-5.

2. A method of increasing the bile secretion rate of the liver and increasing the solids content of the secreted bile which comprises administering a daily dose of 100 to 600 mgm. of 2,2-di-(hydroxymethyl)-bicyclo-(2,2,1)-heptene-5.

3. Compositions for increasing the bile secretion rate of the liver and increasing the solids content of the secreted bile comprising 25 to 200 mgm. of 2,2-di-(hydroxymethyl)-bicyclo-(2,2,1)-heptene-5 and a solid inert, physiologically compatible carrier.

4. Compositions for increasing the bile secretion rate of the liver and increasing the solids content of the secreted bile comprising 25 to 200 mgm. of 2,2-di-(hydroxymethyl)-bicyclo-(2,2,1)-heptene-5 in a liquid inert, physiologically compatible carrier.

References Cited in the file of this patent

Bruson: Chem. Abst., vol. 41, p. 3819(g), 1947.